US006986592B2

(12) United States Patent
Arnold

(10) Patent No.: US 6,986,592 B2
(45) Date of Patent: Jan. 17, 2006

(54) LIGHT COLLECTOR

(76) Inventor: Stephen C. Arnold, 1934 Ontario St., Honeoye Falls, NY (US) 14472

( * ) Notice: Subject to any disclaimer, the term of this patent is extended or adjusted under 35 U.S.C. 154(b) by 62 days.

(21) Appl. No.: 10/431,311

(22) Filed: May 7, 2003

(65) Prior Publication Data

US 2003/0210482 A1 Nov. 13, 2003

Related U.S. Application Data

(60) Provisional application No. 60/378,516, filed on May 7, 2002.

(51) Int. Cl.
*F21V 13/04* (2006.01)

(52) U.S. Cl. ...................... 362/308; 362/328; 362/335

(58) Field of Classification Search ................ 362/296, 362/308, 309, 310, 328, 329, 335, 340, 341; 359/631, 728
See application file for complete search history.

(56) References Cited

U.S. PATENT DOCUMENTS

| | | | | |
|---|---|---|---|---|
| 2,282,167 | A * | 5/1942 | Cullman | 362/188 |
| 2,624,234 | A * | 1/1953 | Edgar | 362/296 |
| 3,689,760 | A * | 9/1972 | Stewart, Jr. | 362/308 |
| 4,642,740 | A * | 2/1987 | True | 362/296 |
| 5,098,184 | A * | 3/1992 | van den Brandt et al. | 362/309 |
| 5,160,192 | A * | 11/1992 | Sugawara | 362/328 |
| 6,688,756 | B1 * | 2/2004 | Akiyama | 362/328 |

* cited by examiner

*Primary Examiner*—Alan Cariaso
(74) *Attorney, Agent, or Firm*—Howard J. Greenwald

(57) ABSTRACT

A light collection apparatus comprising a light source, a collection reflector that reflects the emission of the light source, and a compensation element that collimates light reflected by the reflector into a beam of small diameter.

4 Claims, 8 Drawing Sheets

LIGHT COLLECTOR

CROSS-REFERENCE TO RELATED PATENT APPLICATIONS

This application claims the benefit of the filing date of U.S. provisional patent application Ser. No. 60/378,516, filed May 7, 2002.

This invention relates in one embodiment to the collection of light, and more particularly to the collection of light by reflectance from a curved surface having a well-defined contour.

FIELD OF THE INVENTION

Articles and apparatus for the collection of light by reflectance from a curved surface.

BACKGROUND OF THE INVENTION

The present invention relates to an illumination apparatus that efficiently collects radiation throughout a large solid angle from a source and redirects it through multiple components to maintain high brightness.

Many systems have been devised to collect and redirect radiation with high efficiency and brightness for a variety of purposes. A significant number of these systems have been devised for applications as diverse as hand-held flashlights and digital projection illumination systems. These generally fall into six different classes of approaches described below.

Simple Conical Reflectors: Simple conical reflectors are the oldest method available for the collection and redirection of light and have been addressed in textbooks for decades. They most often fall into one of three categories: spherical reflectors ($\kappa=0$) in which re-imaging a point results in an aberrated image of that point unless the point and its image both lie at the center of curvature; parabolic reflectors ($\kappa=-1$) in which only the point at the focus of the parabola is imaged back to an unaberrated point at infinity, and elliptical reflectors ($-1<\kappa<0$) in which only the point at the first focus of the ellipse is re-imaged at the second focus of the ellipse without aberration. In each case, large aberrations are encountered, and therefore performance is lost at all points other than the defining focus of the conic reflector. This is true even when these conics are used in combination with each other, or in combination with more conventional imaging refractors such as lenses.

Combinations of Conical Reflectors: Combinations of pure conical reflectors have also appeared in the literature in profusion, sometimes with aligned axes, sometimes with tilted axes. Thus, by way of illustration, reference may be had to U.S. Pat. No. 5,613,767, which teaches the use of combined spherical and ellipsoidal reflectors with collinear axes. This particular use of the spherical and ellipsoidal reflectors causes both to work under optimum conditions, but cannot compensate for the aberrations resulting from the physical (volumetric extent) of the source. This issue can be minimized by making the reflectors very large compared to the extent of the source, but this makes the system too bulky for many applications. Moreover, practical issues arise with regard to: thermal management of the lamp since it is essentially enclosed in a trapped air space; manufacturing costs of reflectors that can withstand the heat and have minimal expansion coefficients that would degrade performance; assembly costs associated with precisely aligning the two disparate reflector forms with the emission source; the specificity of the emission source since only a plasma lamp will allow the radiation re-imaged by the spherical component to pass through the emission region without detrimental absorption.

Reference also may be had, e.g., to U.S. Pat. No. 5,408,363, which circumvents some of these problems in its description of blended parabolic reflectors with non-coincident axes. The thermal concerns of this system are relatively manageable compared to the former system, and the manufacturing and assembly concerns are mitigated in the tooling for the reflector. There is furthermore no attempt in this system to re-image the source back onto itself, so the specificity restriction is avoided. However it is clearly stated that the attempt of the invention is to solve the radiation redirection problem solely with the purely conic reflector system. These systems will once again suffer the aberration-induced performance loss characteristic of all pure conic reflectors when used with radiation sources larger than a point.

Reference also may be had, e.g., to U.S. Pat. No. 5,136,491, which is similar to U.S. Pat. No. 5,408,363 in that it teaches the construction of a single reflector that blends two coaxial conic reflectors together along a line of intersection. These systems will once again suffer the aberration-induced performance loss characteristic of all pure conic reflectors when used with radiation sources larger than a point.

By way of further illustration, U.S. Pat. No. 6,318,885 describes a combination of discrete conic reflectors with non-coincident axes to enhance the performance of light collection with the intent of refocusing some of the emission of the source back into the source. One of the fundamental difficulties with this approach is the thermal load placed upon the lamp structure by increasing the radiation load on the surfaces. The increased thermal load often results in reduced lamp life. This system will once again suffer the aberration-induced performance loss characteristic of all conic reflectors when used with radiation sources larger than a point.

Conical Reflectors with Departures: Referring again to the alternative means of collecting light, conical reflectors with departures may be used. Departures from the basic conic reflector have also been described in the literature. Thus, e.g., U.S. Pat. No. 6,302,544 B1 describes a paraboloidal reflector with surface deformations specifically applied to adapt it to a lens array. It specifically defines a parabolic base reflector used in conjunction with a source emanating from a point. The surface of a parabola is deviated in such a way as to uniformly illuminate multiple optical elements rather than to improve the brightness of the system.

Faceted Reflectors: Another alternative light-collecting means is faceted reflectors, which have been described, for instance in U.S. Pat. No. 5,123,729, where the radiation from the source is captured by individual facets of the reflector and redirected to a plane where the flux from each facet is superimposed so as to create a uniformly illuminated rectangular patch with minimal light lost outside of the defined aperture.

Non-Imaging Optical Systems: Yet another alternative light-collecting means is non-imaging optical systems, which have been described especially to make use of extended sources such as fluorescent tubes. See, e.g., U.S. Pat. No. 4,915,479, which describes such an optical system intended to efficiently utilize radiation from high efficiency phosphor light sources. These devices have not been applied effectively to collect light from quasi-point source emitters.

Conical Reflectors: One may also utilize conical reflectors as a light collecting means in combination with lenses, which have been described for illumination purposes. See, e.g., U.S. Pat. No. 5,857,041, where illumination of a manifold of optical fibers through a manifold of lenses is described. In U.S. Pat. No. 5,833,341, the lens is used to nominally collimate the output of an ellipsoidal reflector. The zonal variance is addressed by using an annular flat reflector to reverse some of the rays through the lens, the glass envelope of the lamp, and the emitter. In so doing, it is hoped that they will strike a more favorable zone of the reflector. In theory, this may be perceived to be effective, but several problems are encountered in practice. The first of these is the additional thermal loading caused by the reversed energy impinging on envelope and electrodes. The second is that the angles of the rays reflected by the annular ring will not permit the energy to be re-imaged exactly into the gap of the electrodes. The bulk of this energy is re-imaged onto the electrodes causing overheating of the lamp, premature erosion of the electrodes, and often explosion of the lamp due to increased gas pressure. Such re-imaging of the arc should be avoided unless it can be proven to be done efficiently and reliably over the entire lifespan of the lamp. At the least, it is unfeasible for any source but an arc lamp with a thin plasma.

As is known to those skilled in the art, basic illumination systems are comprised of a source of emitted radiation, and a collection system. The metric defining the best design for a particular application is usually determined by several competing parameters, some practical, some fiscal, and some technical. The first two are most often addressed by required package dimensions, materials cost, manufacturing costs, and assembly and alignment costs.

The most important technical issue in designing illumination systems is to achieve high collection efficiency while holding the physical property of the optical Lagrange Invariant, better known as the etendue, of the system to a minimum. The etendue has been mathematically defined and justified in the literature as a characteristic of all optical systems. (See, for instance, *Modern Optical Engineering*, Warren J. Smith) In one of its more useful forms, the etendue $\epsilon$ of an illuminated panel is defined by the illuminated area and the solid angle through which the illumination arrives:

$$\epsilon=\pi \cdot NA^2 \cdot A$$

where NA is the sine of the half angle of the illumination, and A is the area illuminated. This quantity will usually inflate as one propagates radiation through an illumination optical system due to poor design, resulting in reduced brightness. Designing an illumination system beginning with a source of low etendue is clearly advantageous.

A source with maximum power emitted from a minimal volume is desirable in order to begin with low etendue. For this reason, most critical illumination systems for visual use make use of a compact plasma arc lamp such as a high pressure mercury lamp.

FIG. 1 is a plot of basic geometry, structure, and radiation pattern of a typical compact plasma arc lamp presented in spherical coordinates. Referring to FIG. 1, the three dimensions are radial position in the plane of FIG. 1, angular position θ in the plane of FIG. 1, and angular position ϕ in a direction disposed perpendicularly to the plane of FIG. 1. It can be seen that while the luminance varies greatly as a function of the angle θ, it characteristically varies only slightly as a function of the angle ϕ. If the lamp axis is aligned with the optical axis, and the collecting aperture subtends 130–140 degrees in θ, nearly all of the light from the lamp is collected. Additionally, the distribution of luminance within the arc gap itself is of great importance.

FIG. 2 is a plot of a characteristic luminance distribution for an AC arc lamp presented in Cartesian coordinates. Since this distribution varies with lamp type, arc gap, power level, and whether or not a DC or an AC lamp is employed, the impact of emitter size on the design of the collection system must be considered.

In prior art light sources comprising a lamp and an elliptical reflector, such elliptical reflector forms an imperfect image of the lamp that is disposed along the axis thereof, and the degree of imperfection is in part dependent on the ratio of source extent to the base radius of the elliptical reflector. Such an imperfect image renders the light source unsatisfactory for many uses that require a source having a uniform light distribution therefrom.

It is therefore an object of this invention to provide a light collector for use with a lamp, which directs light from such lamp in manner that is highly collimated (i.e. narrow angle) and has a small cross-section.

SUMMARY OF THE INVENTION

In accordance with the present invention, there is provided a light collection apparatus comprising a light source, a reflector that collects and reflects at least about 70 percent of the emission of said light source, and a compensation element that corrects the zonal magnification errors of the reflector to generate a light beam of low etendue. In embodiments of the present invention, it is assumed that the light source is of finite extent.

BRIEF DESCRIPTION OF THE DRAWINGS

The invention will be described by reference to the following drawings, in which like numerals refer to like elements, and in which.

Figure 2:
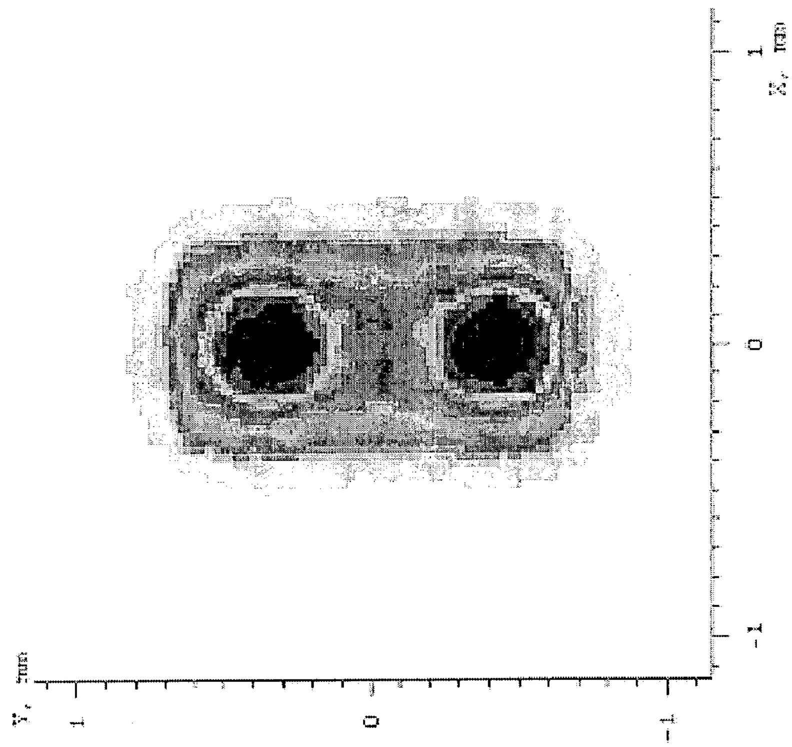
FIG. 2 is a plot of a characteristic luminance distribution for an AC arc lamp presented in Cartesian coordinates.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements. In describing the present invention, a variety of terms are used in the description. Standard terminology is widely used in the optics and photonic arts. For example, one may refer to *Modern Optical Engineering*, Warren J. Smith, the disclosure of which is incorporated herein by reference for its general teachings in optical engineering.

As used herein, the term kappa, or ($\kappa$) is meant to indicate the conic constant of a conic surface.

Figure 1:
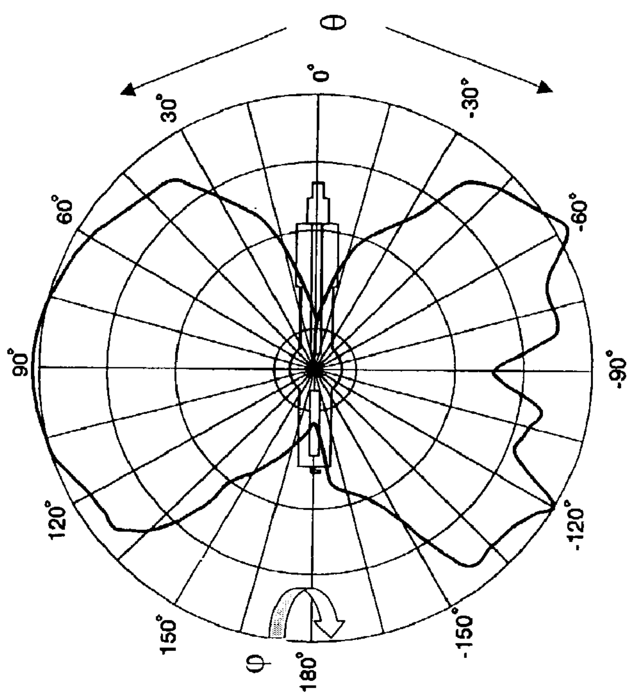
FIG. 1 is a plot of basic geometry, structure, and radiation pattern of a typical compact plasma arc lamp presented in spherical coordinates.

As used herein, the term angular subtense, with regard to the shape of a reflector is meant to indicate the angle subtended by a reflector from the arc measured in the theta plane. The theta plane is the plane depicted in the plane of FIG. 1.

As used herein, the term half angle, with regard to the divergence of light is meant to indicate one half of the total divergence angle of a beam of light.

As used herein, the term zonal variance is meant to indicate the variation in magnification that occurs depending upon the particular location where a ray of light impacts a rotationally symmetric reflector, collector, or refractor. For example, in the present invention, light rays impacting a reflector in a smaller diameter region will be reflected with a greater divergence than light rays impacting a larger diameter region.

The present invention assumes a source of illumination, but makes no distinction regarding the specific characteristics other than the source is assumed to emit throughout a large solid angle, and has some finite extent. The emitter may be opaque, an emitting phosphor, a thick plasma (a plasma that absorbs and reradiates) or a thin plasma (a plasma that permits penetration of radiation), or any other structure that emits radiation. The wavelength of the source is of no consequence so long as materials compatible with the radiation are used to construct the two components redirecting the radiation.

While any conic reflector may be utilized as the base reflector, the preferred approach utilizes an ellipsoid that has been modified with aspheric deformation terms according to the general principles outlined below. Additional surfaces may be interposed between the source and the reflector in order to modify the presentation of the source geometry to the reflector without negating any of the present invention.

The compensator can be a reflective surface or a refractive surface, or a combination of surfaces of either type that serve to advantageously modify the zonal variation of magnification that the collection reflector introduces.

Figure 3B:
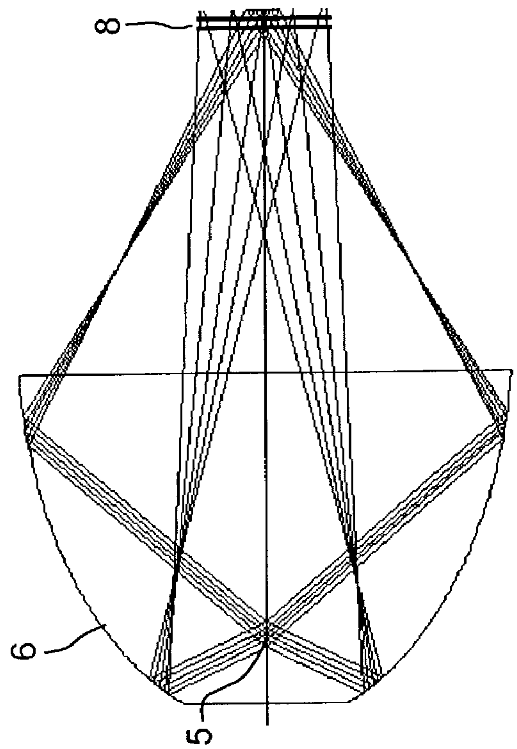
FIG. 3B is a ray tracing of light rays emanating from a relatively larger source and being reflected by the elliptical reflector of FIG. 3A.
Figure 3A:
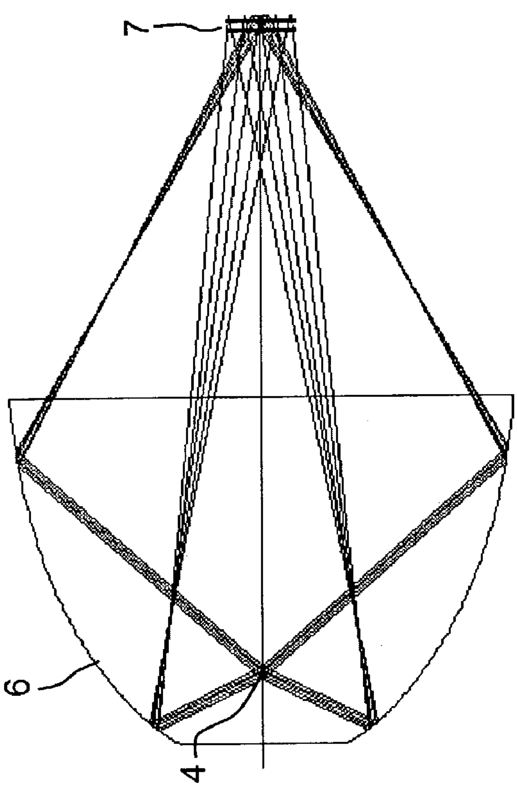
FIG. 3A is a ray tracing of light rays emanating from a small source and being reflected by an elliptical reflector.

A standard elliptical reflector forms an imperfect image of a source that is disposed along its axis, and the degree of imperfection is in part dependent on the ratio of source extent to the base radius of the collection reflector. FIG. 3A is a ray tracing of light rays emanating from a small light source 4 and being reflected by an elliptical reflector 6, and FIG. 3B is a ray tracing of light rays emanating from a relatively larger light source 5 and being reflected by the elliptical reflector 6 of FIG. 3A. Referring to FIGS. 3A and 3B, it can be seen that the larger light source of FIG. 3B results in a higher etendue, as indicated by both the larger angles subtended by the convergent bundles of light rays, and the larger area 8 (versus area 7 in FIG. 3A) illuminated by these rays in the vicinity of the second focus of the ellipse.

FIGS. 3A and 3B also demonstrate another problem that is addressed by the current invention, which is that the extent of the image varies as a function of the radial zone of the elliptical reflector. This may be considered to be a magnification variation that occurs as a function of the radial zone of the reflector since the image size of the source varies with this radial zone. This same behavior also exists in other reflectors based upon conic sections. In FIG. 3B, it is evident that the two ray bundles being reflected by two different radial zones of the reflector form "images" of the source at two substantially different magnifications, evidenced by the different illuminated areas 7 and 8 at the second focus of the ellipse.

The present invention corrects a significant amount of this variation through the implementation of a compensator, and does so without directing any of the rays back to the source. In this way, the thermal loading of the lamp can be maintained reliably throughout the lifespan of the lamp. Additionally, premature erosion of the electrodes is avoided.

The compensator is placed in such a way that the light from the zones of the reflector is spatially separated as it impinges the compensator. A preferred method is to place this component very near the reflector so that the zonal rays have intermingled as little as possible.

A preferred method is to utilize a reflector based upon an ellipse, and a compensator that is refractive to produce a collected beam of radiation that is nominally collimated. A preferred material for this refractive component is an optical resin that can be readily formed with aspheric surfaces, and that is stable at the temperatures encountered in close proximity to the source. A preferred reflector is an elliptical reflector whose surface shape has been modified with higher order terms, which, in combination with the aspheric contours of the second component, serve to correct most of the image extent variation. Additional performance can be obtained by shifting the source away from the focus of the base ellipse.

The general shape of this refractive component varies with the conic constant of the base reflector. The progression of refractor shapes for a range of reflector conic constants is depicted in FIGS. 4A through 7A. It is clear that these base surfaces are hyperbolic surfaces, having conic constants less than −1.0. The strength of the hyperbola on the first surface weakens as the conic constant of the base ellipse is reduced, but the hyperbola of the second surface weakens much faster. A preferred surface modifies the hyperbolic surfaces with higher order terms. All of these figures depict reflectors with the same base radius of curvature and identical lamps.

Figure 4B:
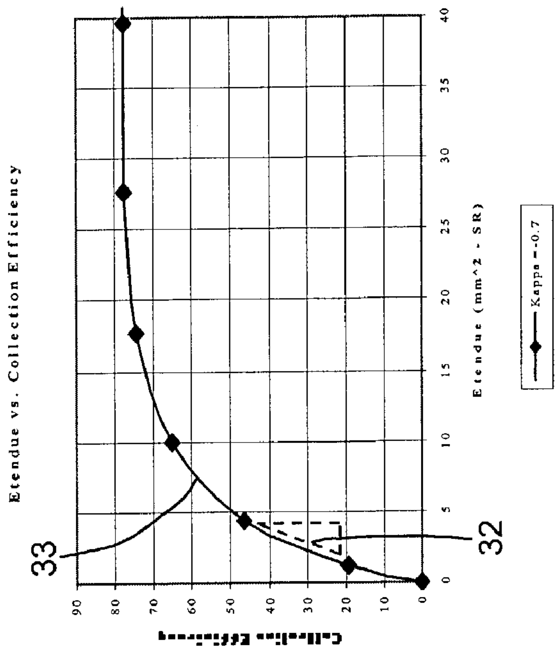
FIG. 4B is a graph of etendue versus collection efficiency for the light collector depicted in FIG. 4A.
Figure 4A:
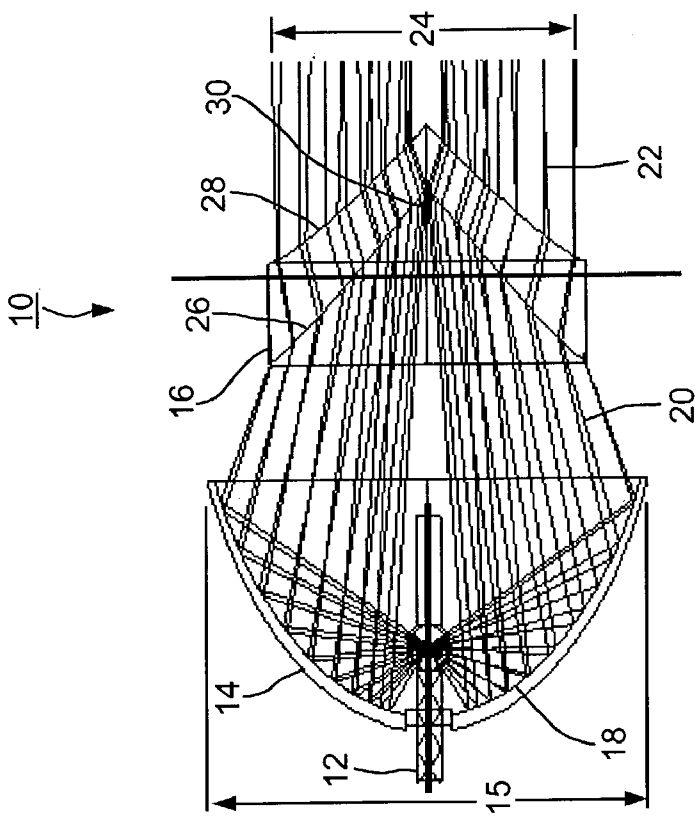
FIG. 4A is a schematic view of a light collector comprised of a lamp, a reflector, and a collector wherein the reflector is comprised of a conic section having substantially the shape of an ellipse with a kappa of −0.7.

FIG. 4A is a schematic view of a light collecting apparatus comprised of a lamp, a reflector comprising a conic section, and a compensation element. Referring to FIG. 4A, light collecting apparatus 10 comprises lamp 12, reflector 14, and a refractive compensation element 16. Reflector 14 is comprised of a conic section 18 which, in the preferred embodiment depicted in FIG. 4A, is substantially in the shape of an ellipse with a kappa of −0.7. In general, it is preferred to have the ellipticity of the conic section 18 range from a kappa of from about −0.4 to about −0.7, and more preferred from about −0.55 to about −0.65.

In one embodiment, described elsewhere in this specification and/or illustrated in FIG. 10, the conic section 18 does not describe a perfect ellipse but has a minor departure from such ideal elliptic shape. The amount of departure from ideality may be determined by computer optimization of ray trajectories. Reference may be had, e.g., to U.S. Pat. Nos. 5,882,107, 5,803,568, and the like. The entire disclosure of each of these United States patents is hereby incorporated by reference into this specification.

In one embodiment, the reflector 14 has a maximum dimension 15 sufficient to collect at least about 85 percent of the light emitted by lamp 12. To effect such degree of collection efficiency, it is preferred that the angular subtense of the reflector 14 is from about 30 degrees to about 140 degrees and, more preferably, 20 to about 150 degrees. In one embodiment, the reflector 14 has a reflectivity of at least about 90 percent and, more preferably, at least about 95 percent. It is preferred that reflector 14 be rotationally symmetrical.

Referring again to FIG. 4A, and in the preferred embodiment depicted therein, lamp 14 is preferably a short arc lamp, or another comparable device, that is adapted to ionize gas and form a plasma. In one embodiment, the plasma is formed from mercury gas. As the electrons in the mercury atoms become excited to a higher energy state and thereafter return to their original state, they emit photons. In one embodiment, the plasma within the reflector 14 has a relatively minimal volume, often on the order of less than about 1 cubic millimeter and, more preferably, less than about 0.5 cubic millimeters. In one embodiment, the volume of the plasma is less than about 0.3 cubic millimeters.

Referring again to FIG. 4A, the reflector 14 directs light rays 20 onto refractor 16, which is also referred to elsewhere in this specification as a compensator 16. In one preferred embodiment, the refractor 16 is comprised of means for collimating light rays 20 to provide collimated rays 22.

It is preferred that the collimated rays 22 be collimated so that they diverge less than about 10 degrees half angle, on average. In addition to obtaining such an extent of average collimation, it is preferred that the diameter 24 of the collimated bundle of rays be from about 25 to about 75 millimeters and, more preferably, from about 10 to about 50 millimeters.

One preferred means of obtaining the desired degree of collimation in the desired configuration is illustrated in FIG. 4A, wherein refractor 16 is comprised of a first hyperbolic surface 26 and a second hyperbolic surface 28. Each of these hyperbolic surfaces 26/28 is preferably comprised of substantially transparent material (such as, e.g., transparent plastic) that refracts the rays passing through it to achieve the desired collimated output.

The specifics of the hyperbolic surfaces 26 and 28 will depend, in part, upon the degree to which the reflector 18 deviates from ideal ellipticity and may be determined, e.g., by the aforementioned computer optimization of ray trajectories. In the embodiment depicted in FIG. 4A, two hyperbolic surfaces 26/28 are used. In another embodiment, not shown, one may utilize other combinations of surfaces to achieve the same compensation.

In one preferred embodiment, illustrated in FIG. 4A, the refractor/compensator 16 is preferably positioned inside of the second focus 30 of the substantially elliptical reflector. In particular, in the embodiment illustrated, the hyperbolic surface 26 is positioned within the second focus 30 of the reflector 14. As used herein, "inside' is meant to indicate that hyperbolic surface 26 is positioned on the "first focus side" of second focus 30. In one aspect of this embodiment, the hyperbolic surface 26 is disposed within less than about 5 millimeters of the second focus 30 and, more preferably, within less than about 3 millimeters of such second focus 30.

In one embodiment, the hyperbolic surfaces 26 and/or 28 comprise or consist essentially of material with an index of refraction of from about 1.3 to about 2.2 and, more preferably, from about 1.5 to about 1.7. Thus, e.g., one may use materials such as, e.g., glass, plastic, contained fluid(s), etc. Many methods for mechanically joining and affixing the positions of refractor 16 and reflector 14 with respect to each other are known, and will be apparent to those skilled in the art.

FIG. 4B is a graph of etendue versus collection efficiency for the embodiment depicted in FIG. 4A. It should be noted that the slope 32 of curve 33 is relatively steep, being close to 100 percent at low etendue, and decreasing to about 5 percent at high etendue, with a total collection efficiency of from about 70 to about 80 percent.

Figure 5A:
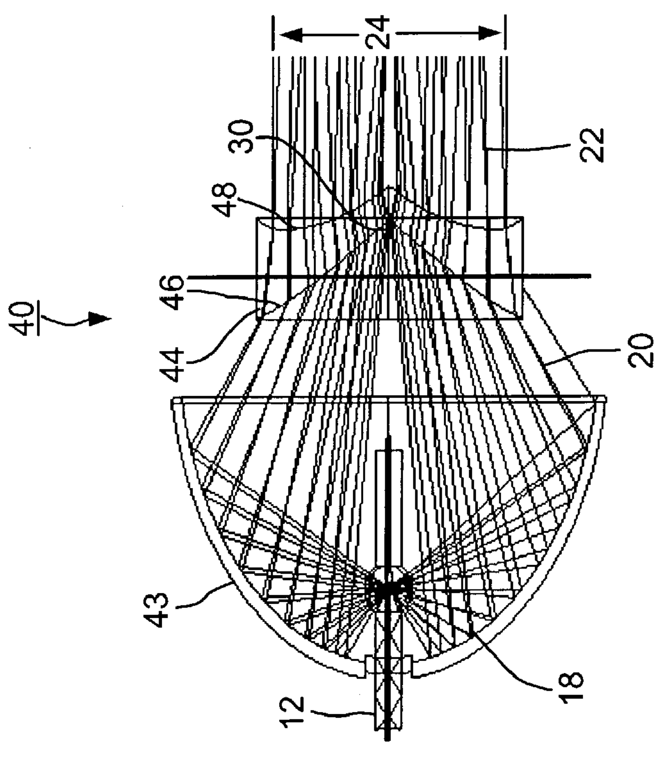
FIG. 5A is a schematic view of a light collector similar to the collector of FIG. 4 but differing therefrom in that the collector has a kappa of about −0.6.
Figure 5B:
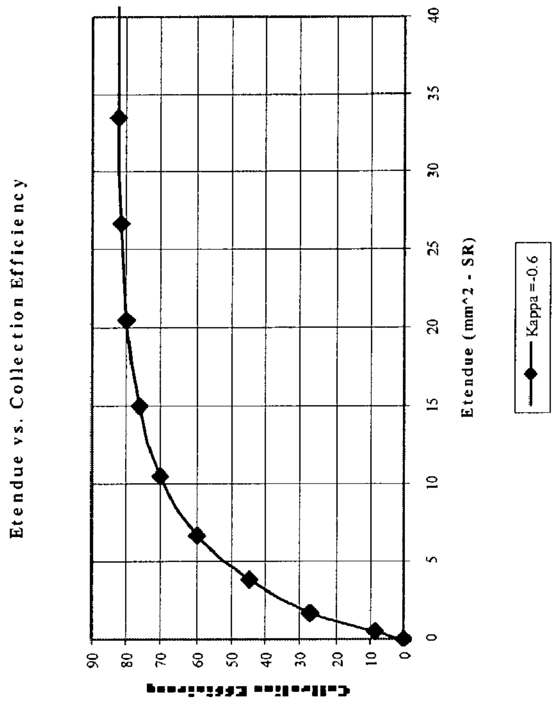
FIG. 5B is a graph of etendue versus collection efficiency for the light collector depicted in FIG. 5A.

FIG. 5A discloses a light collecting apparatus 40 similar to that depicted in FIG. 4A but differing therefrom in that the apparatus 40 has a kappa of about −0.6. With such a different kappa, the reflector 43 and hyperbolic surfaces 46 and 48 of refractor 44 must have a different shape in order to achieve the same degree of collimation. It should be noted that the diameter 24 of the collimated rays 22 is smaller for the embodiment of FIG. 5A. Diameter 24 is highly dependent on the arc gap dimension, the radiation distribution in the arc, the physical size of the reflector, and the degree of collimation. For a given level of collimation, a smaller beam diameter results in a lower (better) etendue. In FIGS. 4A–7A and FIG. 10A, there is assumed a 1.2 mm arc gap length with a radiation distribution as depicted in FIG. 2, and reflectors with a base radius of curvature of 20 mm, resulting in the collection efficiency/etendue data depicted in FIGS. 4B–7B and FIG. 10B.

Figure 6B:
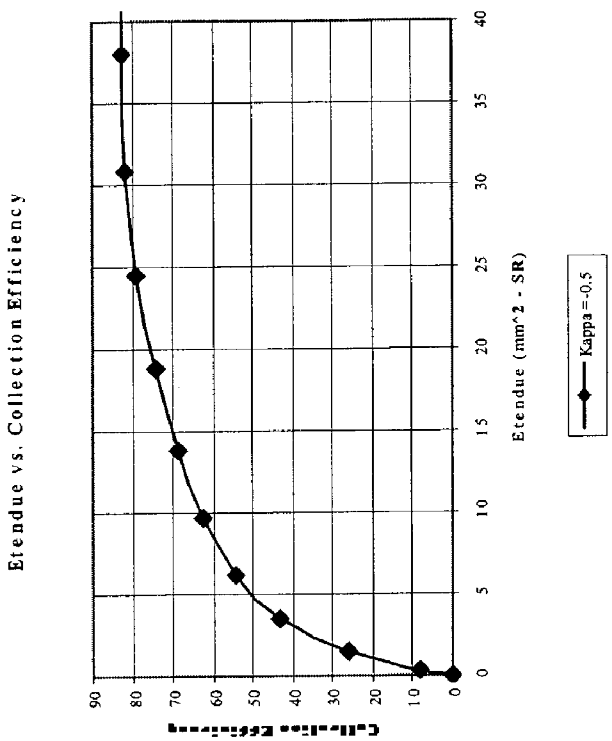
FIG. 6B is a graph of etendue versus collection efficiency for the light collector depicted in FIG. 6A.
Figure 6A:
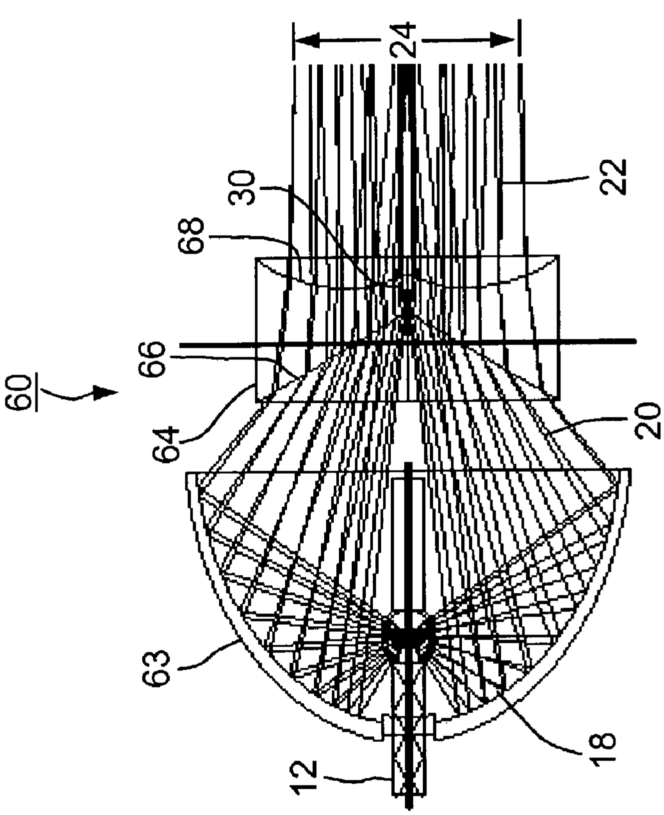
FIG. 6A is a schematic view of a light collector similar to the collector of FIG. 4 but differing therefrom in that the collector has a kappa of about −0.5.
Figure 7B:
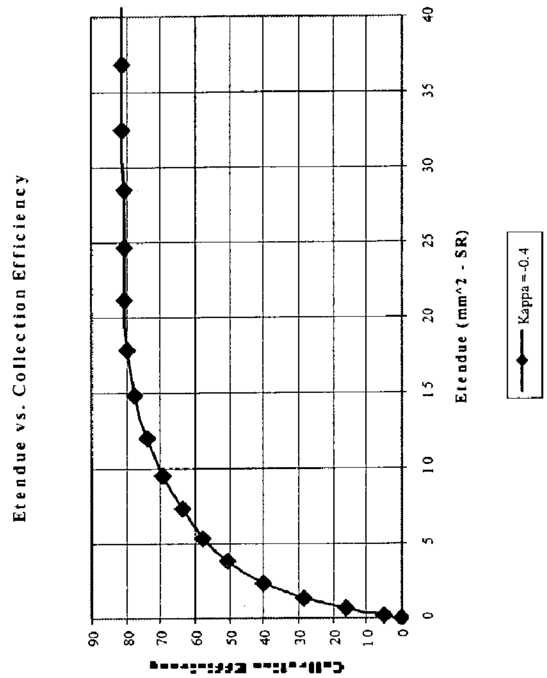
FIG. 7B is a graph of etendue versus collection efficiency for the light collector depicted in FIG. 7A.
Figure 7A:
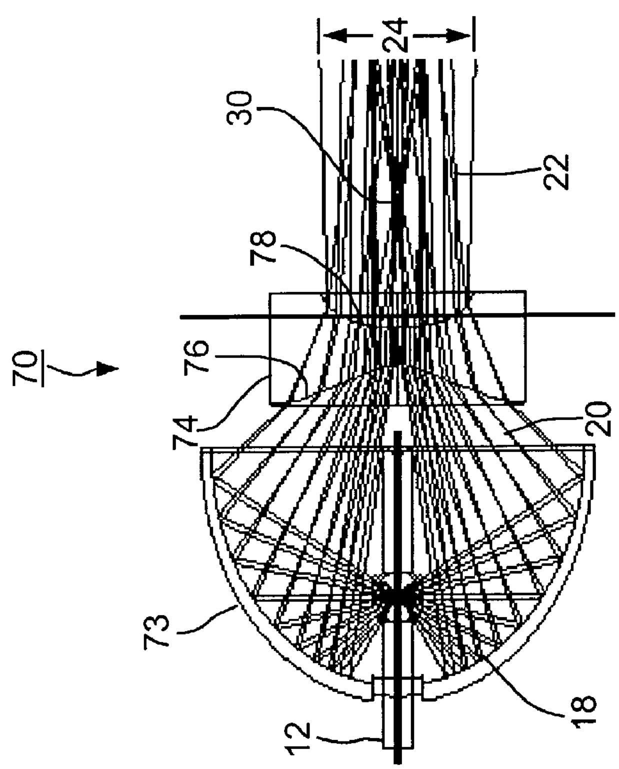
FIG. 7A is a schematic view of a light collector similar to the collector of FIG. 4 but differing therefrom in that the collector has a kappa of about −0.4.

FIGS. 6A and 7A also define devices similar to those of FIGS. 4A and 5A but with different kappa and, consequently, different etendues, as is apparent from their accompanying graphs. Referring to FIG. 6A, apparatus 60 comprises reflector 63, refractor 64 having a first hyperbolic surface 66, a second hyperbolic surface 68, and a kappa of −0.5. Referring to FIG. 7A, apparatus 70 comprises reflector 73, refractor 74 having a first hyperbolic surface 76, a second hyperbolic surface 78, and a kappa of −0.4.

Figure 8:
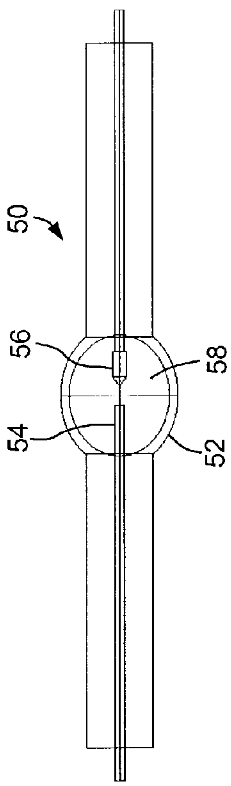
FIG. 8 is a schematic diagram of one preferred lamp structure used as a light source in the light collectors of FIGS. 4A–7A comprised of a quartz envelope within which is disposed electrodes and a gas.

FIG. 8 is a diagram of the preferred lamp structure 50 that comprises lamp 12 of FIGS. 4A, 5A, 6A, and 7A. Referring to FIG. 8, lamp 50 is preferably comprised of a quartz envelope 52 within which is disposed electrodes 54 and 56 and gas 58. In one aspect of this embodiment, gas 58 is comprised of a combination of xenon and mercury. This lamp, and other suitable lamps, preferably produces plasmas with the desired small volume recited previously in this specification.

Figure 9B:
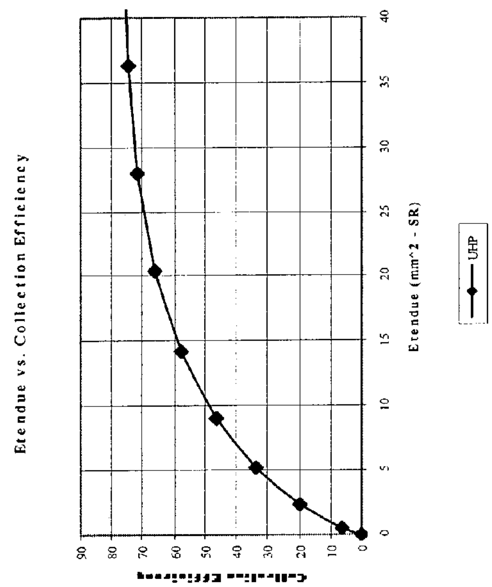
FIG. 9B is a graph of etendue versus collection efficiency for the light collector depicted in FIG. 9A.
Figure 9A:
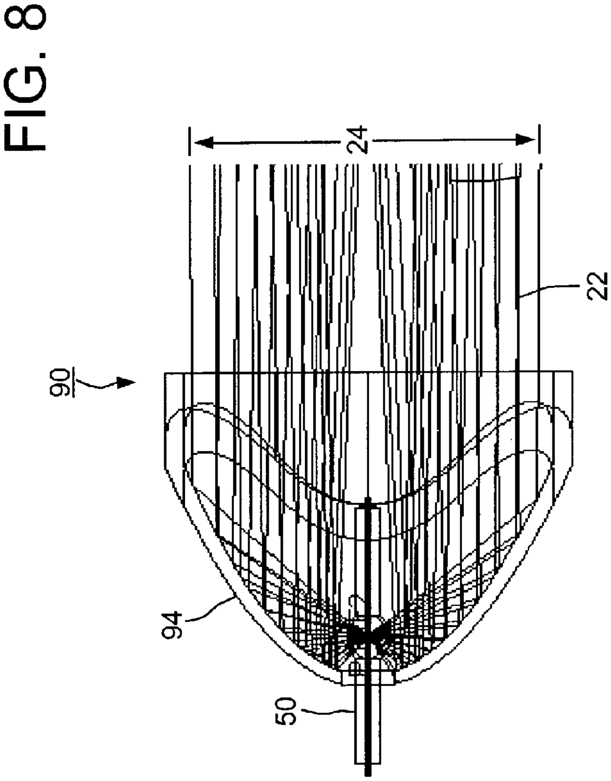
FIG. 9A is a schematic view of an industry standard parabolic reflector within which is disposed the lamp of FIG. 8.
Figure 10B:
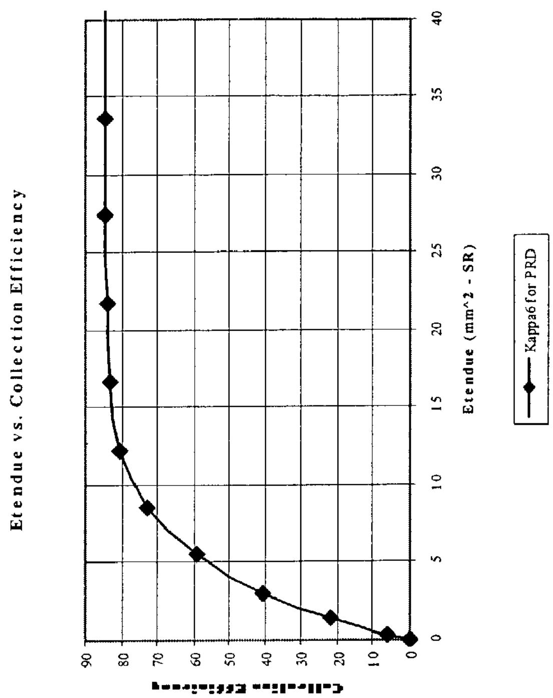
FIG. 10B is a graph of etendue versus collection efficiency for the light collector depicted in FIG. 10A.
Figure 10A:
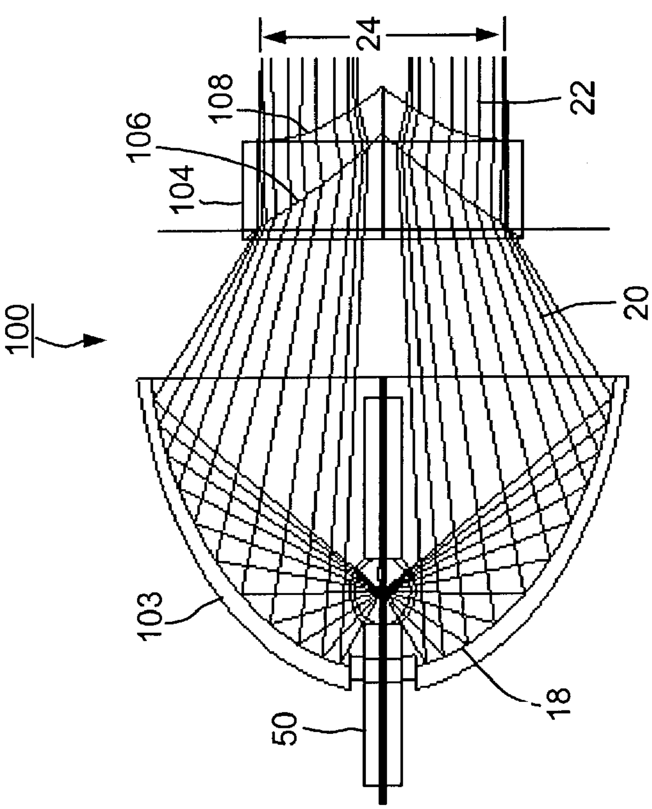
FIG. 10A is a schematic view of a reflector of the present invention with a kappa of −0.6 within which is disposed the lamp of FIG. 8.

FIG. 9A is a schematic view of an industry standard parabolic reflector within which is disposed lamp 50 of FIG. 8, and FIG. 10A is a schematic view of a reflector of the present invention with a kappa of −0.6 within which is disposed the lamp 50 of FIG. 8. Referring to FIG. 9A, apparatus 90 comprises lamp 50, and standard parabolic reflector 94. Referring to FIG. 10A, apparatus 100 is similar to apparatus 10, 40, 60, and 70 of FIGS. 4A, 5A, 6A, and 7A, and comprises lamp 50, reflector 103, refractor 104 comprising a first hyperbolic surface 106, a second hyperbolic surface 108, and a kappa of about −0.6.

It will be apparent that the diameter of the beam of light rays 22 emanating from apparatus 100 is significantly smaller that the corresponding diameter of the beam of light rays 22 emanating from apparatus 90. A comparison of graphs 9A and 10A more quantitatively indicates the superiority of the embodiment of FIG. 10A in providing a highly collimated beam of light reflected from lamp 50.

The preferred configurations depicted in FIGS. 4A, 5A, 6A, 7A, and 10A can be further adjusted to generate a small diameter output beam, thereby reducing the cost and physical volume of optical components that receive the collected radiation.

The present invention has been shown to be compatible with practical light source dimensions and distributions. It is to be understood that no presumption regarding the source being a point source is necessary in the present invention. In some embodiments, the source has been assumed to be a short arc source with a non-uniform luminance distribution as depicted in FIG. 2. The axial extent of this source is preferably 1.2 mm, in one embodiment. The structure of a representative lamp, including metallic and glass components were included in a detailed performance model that was utilized to generate the etendue data of the "B" series of Figures described in this specification and are depicted in FIG. 8. All of the practical material construction is compatible with the present invention. The material parameters of the modeled refractor or compensator are similar to those of cyclic olefin copolymers. In FIGS. 4B, 5B, 6B, 7B, 9B, and 10B, the far field irradiance distribution generated by the Monte Carlo Ray tracing model was collected, and the encircled power, normalized to the power emitted by the lamp over 4π steradians was plotted versus the etendue. Data generated by placing two identical lamps in two different optical systems is compared in FIGS. 9B and 10B using this method. FIG. 9B depicts a parabolic reflector based upon measured data from a commercially available reflector and lamp as depicted in FIG. 9A. FIG. 10B models the identical lamp within a preferred configuration of FIG. 10A. It is apparent from this data that the low etendue collection efficiency is superior with the present invention, both from the perspective of performance as well as size. The apparatus 100 of FIG. 10A is the preferred embodiment, with a kappa of about −0.6 being considered to be optimal.

In the embodiments depicted in FIGS. 4A–7A and FIG. 10, a general surface equation is used to define and characterize the respective apparatus 10, 40, 60, 70, and 100, as follows:

$$z = \frac{cr^2}{1 + \sqrt{1 - (1+\kappa)c^2r^2}} + \alpha_1 r^2 + \alpha_2 r^4 + \alpha_3 r^6 + \ldots$$

where z is surface contour SAG at a particular radial distance r from the optical axis, c is the curvature, i.e. the reciprocal of the radius, and $\alpha_1$, $\alpha_2$, $\alpha_3$ . . . are the aberration coefficients.

The following Tables 1–5 provide the data for the apparatus of FIGS. 4A–7A and 10A. The thicknesses listed therein are the distances between the surface of the identified object, and the surface of the subsequent object which is struck by the rays of light passing therethrough. For all systems, a value of zero was used for $\alpha_1$; hence $\alpha_1$ is not listed in the tables. The remaining coefficients $\alpha_2$, $\alpha_3$, $\alpha_4$, etc. define the departure from the true elliptical surfaces of the reflectors and the true hyperbolic surfaces of the refractors. Thus in the preferred embodiment, reflectors 14, 43, 63, 73, and 103, and refractors 16, 46, 66, 76, and 106 are modified so that they comprise surfaces that deviate slightly from true elliptic and true hyperbolic surfaces so that the residual reflector-induced errors are corrected by the refractor, rendering the beam with minimal half angle deviation.

In the numerical notation contained therein, the exponential notation is to be taken referenced to base 10, i.e. 1.234e-05 is equal to $1.234\times10^{-5}$. For all systems of FIGS. 4A–7A and FIG. 10A, the compensator element was made of BK7, a commercially available optical grade glass made by the Schott Corporation of Duryea, Pa. It will be apparent that many other optical glass or optical polymers would be suitable for use as the compensator element.

TABLE 1

FIG. 4A, Kappa = −.7 System

| OBJECT | Radius | Thickness | κ | $\alpha_2$ | $\alpha_3$ | $\alpha_4$ | $\alpha_5$ | $\alpha_6$ | $\alpha_7$ | $\alpha_8$ |
|---|---|---|---|---|---|---|---|---|---|---|
| Mirror | 20 | 84 | −0.7 | 3.5517754e-007 | 3.5398759e-010 | 3.2139369e-014 | 7.7349611e-016 | 7.5477292e-019 | 7.5538504e-023 | −6.3247101e-025 |
| BK7 | 0 | 10 | −1.68 | 2.8593989e-006 | −2.0433784e-008 | 1.0908026e-011 | 6.139199e-016 | 0 | 0 | 0 |
| Air | 0 | | −1.90 | −3.3927067e-005 | 9.7196183e-008 | −1.3663314e-010 | 6.2157006e-014 | 0 | 0 | 0 |

TABLE 2

FIG. 5A, Kappa = −.6 System

| OBJECT | Radius | Thickness | κ | $\alpha_2$ | $\alpha_3$ | $\alpha_4$ | $\alpha_5$ | $\alpha_6$ | $\alpha_7$ | $\alpha_8$ |
|---|---|---|---|---|---|---|---|---|---|---|
| Minor | 20 | 67 | −0.6 | 3.9781907e−016 | 1.250289e−018 | 2.1274086e−021 | 2.5964756e−024 | 0 | 0 | 0 |
| BK7 | 0 | 5 | −2.355972 | −1.3241259e−005 | −3.3529999e−009 | −3.3700532e−012 | 1.4857976e−014 | 0 | 0 | 0 |
| Air | 0 | | −3.074368 | −0.00025442855 | 1.4430103e−006 | −3.6344245e−009 | 3.152737e−012 | 0 | 0 | 0 |

TABLE 3

FIG. 6A, Kappa = −.5 System

| OBJECT | Radius | Thickness | κ | $\alpha_2$ | $\alpha_3$ | $\alpha_4$ | $\alpha_5$ | $\alpha_6$ | $\alpha_7$ | $\alpha_8$ |
|---|---|---|---|---|---|---|---|---|---|---|
| Mirror | 20 | 55 | −0.5 | −3.3901374e−008 | 5.1876889e−010 | 5.8847674e−013 | 3.4600067e−016 | 2.8412596e−025 | 2.3278817e−028 | 1.6608479e−031 |
| BK7 | 0 | 5 | −3.708151 | −5.4220578e−007 | −3.2749709e−010 | −1.9877252e−012 | −3.0535369e−015 | −2.0287255e−018 | 6.1100252e−022 | 6.4427071e−024 |
| Air | 0 | | −9.079039 | −0.0003056709 | 1.6126265e−006 | −3.6160593e−009 | 2.7683611e−012 | 5.2335169e−018 | 1.3676658e−019 | 3.674274e−022 |

TABLE 4

FIG. 7A, Kappa = −.4 System

| OBJECT | Radius | Thickness | κ | $\alpha_2$ | $\alpha_3$ | $\alpha_4$ | $\alpha_5$ | $\alpha_6$ | $\alpha_7$ | $\alpha_8$ |
|---|---|---|---|---|---|---|---|---|---|---|
| Mirror | 20 | 45 | −0.4 | −5.8170422e−009 | 2.6697253e−012 | 6.6264471e−015 | 1.0154995e−017 | 1.3504572e−020 | 5.1921566e−023 | −7.6314148e−026 |
| BK7 | 0 | 5 | −8.39332 | 3.3729685e−005 | −1.6089287e−007 | −8.0710626e−012 | 2.0436306e−013 | 3.5852846e−016 | 3.7048279e−019 | −4.7215536e−023 |
| Air | 0 | | −724.2409 | −0.0006484196 | 1.6720914e−006 | 2.042962e−008 | 1.0522571e−010 | 1.0000349e−013 | −7.092921e−015 | −1.369922e−016 |

TABLE 5

Preferred System: FIG. 10A, Kappa = −.6 System

| OBJECT | Radius | Thickness | κ | $\alpha^2$ | $\alpha^3$ | $\alpha^4$ | $\alpha^5$ | $\alpha^6$ | $\alpha^7$ | $\alpha^8$ |
|---|---|---|---|---|---|---|---|---|---|---|
| Mirror | 16 | 58 | −0.6 | −1.12174e−005 | 6.778261e−008 | −1.44465e−010 | 1.266746e−013 | 0 | 0 | 0 |
| BK7 | 0 | 5 | −2.355959 | −0.000170776 | 1.219052e−006 | −3.30756e−009 | 3.134835e−012 | 0 | 0 | 0 |
| Air | 0 | | −3.074368 | −0.000288738 | 1.679744e−006 | −4.80608e−009 | 5.426229e−012 | 0 | 0 | 0 |

It is, therefore, apparent that there has been provided, in accordance with the present invention, an apparatus that efficiently collects radiation throughout a large solid angle from a source and redirects it through multiple components to maintain high brightness. It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A light collection apparatus comprising a light source, an elliptical reflector that collects and reflects at least about 70 percent of the emission of said light source, and a refractor comprising a first modified hyperbolic surface and a second modified hyperbolic surface, wherein said refractor transmits and refracts said at least about 70 percent of said emission of said light source reflected by said reflector to generate a light beam of low etendue, and wherein said first modified hyperbolic surface and said second modified hyperbolic surface are modified relative to true hyperbolic surfaces such that said at least about 70 percent of said emission from said light scarce is refracted by said refractor to form a beam comprised of parallel rays.

2. The apparatus as recited in claim 1, wherein at least the first modified hyperbolic surface of said refractor is positioned inside of the second focus of said elliptical reflector.

3. A light collection apparatus comprising a light source, a modified elliptical reflector that collects and reflects at least about 70 percent of the emission of said light source, and a refractor comprising a first modified hyperbolic surface and a second modified hyperbolic surface, wherein said refractor transmits and refracts said at least about 70 percent of said emission of said light source reflected by said reflector to generate a light beam of low etendue; and wherein said modified elliptical reflector is modified from a true elliptical surface and said first modified hyperbolicsurface and said second modified hyperbolic surface are modified relative to true hyperbolic surfaces such that said at least about 70 percent of said emission from said light source is refracted by said refractor to form a beam comprised of parallel rays.

4. The apparatus as recited in claim 3, wherein at least the first modified hyperbolic surface of said refractor is positioned inside of the second focus of said modified elliptical reflector.

* * * * *